(12) United States Patent
Schwarz et al.

(10) Patent No.: US 12,541,740 B2
(45) Date of Patent: Feb. 3, 2026

(54) INVENTORY MANAGEMENT METHOD AND SYSTEM WITH SYNCHRONIZED SHELF DEVICES AND SENSORS ACTIVATION

(71) Applicant: Captana GmbH, Ettenheim (DE)

(72) Inventors: Thomas Schwarz, Hohberg (DE); Michael Unmüßig, Ettenheim (DE)

(73) Assignee: Captana GmbH (DE)

( * ) Notice: Subject to any disclaimer, the term of this patent is extended or adjusted under 35 U.S.C. 154(b) by 145 days.

(21) Appl. No.: 18/289,629

(22) PCT Filed: May 6, 2022

(86) PCT No.: PCT/EP2022/062264
§ 371 (c)(1),
(2) Date: Nov. 6, 2023

(87) PCT Pub. No.: WO2022/234075
PCT Pub. Date: Nov. 10, 2022

(65) Prior Publication Data
US 2024/0242176 A1    Jul. 18, 2024

(30) Foreign Application Priority Data

May 7, 2021   (FR) ...................................... 2104843

(51) Int. Cl.
*G06Q 10/087* (2023.01)
*G06Q 10/10* (2023.01)
(52) U.S. Cl.
CPC .................. *G06Q 10/087* (2013.01)
(58) Field of Classification Search
CPC .............. G06Q 10/087; G06Q 30/06
See application file for complete search history.

(56) References Cited

U.S. PATENT DOCUMENTS 8,189,855 B2 * 5/2012 Opalach ............... G06Q 10/087
382/209
10,922,646 B1 * 2/2021 Humair ............... G06Q 10/087
(Continued)

FOREIGN PATENT DOCUMENTS

| EP | 3032459 A1 | 6/2016 |
| TW | 201636963 A | 10/2016 |
| WO | 2019073063 A1 | 4/2019 |

OTHER PUBLICATIONS

International Search Report for PCT/EP2022/062264 mailed Sep. 2, 2022. 4 pages.
(Continued)

*Primary Examiner* — Garcia Ade
(74) *Attorney, Agent, or Firm* — Lerner David LLP

(57) ABSTRACT

The invention relates to an inventory management method which comprises the steps of: controlling shelf devices (AID) arranged on shelves of a fixture to cause the shelf devices to implement a localization process: controlling a sensor (CAM) to acquire sensor signals during the localization process: and localizing each of said shelf devices based on the acquired sensor signals. Controlling the shelf devices comprises sending a device command (D-Cd) to each of said shelf devices (AID), wherein the device command includes a localization process execution time and causes each of said shelf devices to have been switched from a sleep mode (SLPd) to a wake-up mode (WU-BLK) at the localization process execution time and to emit a localization signal before switching back to the sleep mode. Controlling said sensor comprises sending a sensor command (C-Cd) to the sensor (CAM), wherein the sensor command includes the localization process execution time and causes the sensor to have been switched from a sleep mode (SLPc) to a wake-up mode (WU-CAP) at the localization process execution time
(Continued)

and to capture the localization signal emitted by each of said shelf devices before switching back to the sleep mode.

12 Claims, 3 Drawing Sheets

(56) References Cited

U.S. PATENT DOCUMENTS

| | | | |
|---|---|---|---|
| 10,922,649 B2* | 2/2021 | Nakdimon | G06Q 10/087 |
| 2016/0180679 A1 | 6/2016 | Cowley et al. | |
| 2017/0278057 A1 | 9/2017 | Itou et al. | |
| 2020/0143315 A1* | 5/2020 | Marquette | G06Q 10/087 |
| 2022/0318728 A1* | 10/2022 | Rao | H04N 23/661 |

OTHER PUBLICATIONS

French Preliminary Search Report for FR 2104843 completed Dec. 7, 2021. 2 pages. (see p. 1, categorizing the cited references).

* cited by examiner

INVENTORY MANAGEMENT METHOD AND SYSTEM WITH SYNCHRONIZED SHELF DEVICES AND SENSORS ACTIVATION

CROSS-REFERENCE TO RELATED APPLICATIONS

The present application is a national phase entry under 35 U.S.C § 371 of International Application No. PCT/EP2022/062264 filed May 6, 2022, which claims priority from French Application No. 2104843 filed May 7, 2021, all of which are hereby incorporated herein by reference.

TECHNICAL FIELD

The field of the invention is the one of inventory management systems and methods for warehouses or retail stores. The invention relates more particularly to localizing shelf devices using sensors arranged in such warehouses or retail stores, in order for instance to initialize or update a planogram indicating the placement of goods in a fixture.

DESCRIPTION OF RELATED ART

Inventory management systems based on computer-vision technologies are known which capture images of electronic shelf labels (referred to below as ESLs) arranged within a sales area to create a real-time planogram (realogramm) of the current placement of articles on the shelves of the sales area. Automatic shelf monitoring may then recognize and mark missing stocks directly in a visual representation of the shelves, thereby improving on-shelf availability by triggering re-orders of the articles.

One such system is for instance described in the international application WO 2019/073063 A1 in the name of the Applicant. In this system, an ESL localization process is implemented which consists in controlling an ESL so that it emits an optical signal, such as a specific flashing sequence, which is captured by a camera. Image processing techniques are then used to recognize, within the images captured by the camera, the ESL which emits the optical signal and to derive from this recognition a position in the sales area for an article associated with the ESL.

In order to initialize or update a planogram indicating the placement of the articles within the sales area, this localization process is to be implemented for each of the ESLs arranged within the sales area.

However, ESLs and cameras are powered by means of embedded batteries which service life is by definition limited. Maintaining this service life as long as possible is therefore crucial to avoid unexpected replacement costs.

BRIEF DESCRIPTION OF THE INVENTION

There is therefore a need for an inventory management system which could perform the above-mentioned localization process with a low power consumption. The invention aims at meeting this need and proposes to this effect an inventory management method which comprises the steps of:
- controlling shelf devices arranged on shelves of a fixture to cause the shelf devices to implement a localization process;
- controlling a sensor to acquire sensor signals during the localization process; and
- localizing each of said shelf devices based on the acquired sensor signals.

Controlling the shelf devices comprises sending a device command to each of said shelf devices. The device command includes a localization process execution time and causes each of said shelf devices to have been switched from a sleep mode to a wake-up mode at the localization process execution time and to emit a localization signal before switching back to the sleep mode.

Controlling the sensor comprises sending a sensor command to the sensor (CAM). The sensor command includes the localization process execution time and causes the sensor to have been switched from a sleep mode to a wake-up mode at the localization process execution time and to capture the localization signal emitted by each of said shelf devices before switching back to the sleep mode.

Certain preferred, but non-limiting aspects of the method are as follows:
- the sensor command is sent from a synchronisation server to the sensor and the device command is sent to each of said shelf devices from a shelf device management server following receipt by the shelf device management server of a management command from the synchronization server;
- the sensor command and the management command are sent by the synchronisation server at a predetermined period before the localization process execution time;
- upon receipt of the device command, each of said shelf devices schedules a wake-up event based on a device command arrival time and the localization process execution time;
- upon receipt of the sensor command, the sensor schedules a wake-up event based on a sensor command arrival time and the localization process execution time;
- the sensor is a camera arranged to capture images of the fixture during the localization process, the localization signal emitted by each of the shelf devices during the localization process is an optical signal and localizing each of said shelf devices comprises determining a position of each of said shelf devices within the captured images;
- determining a position of each of said shelf devices within the captured images comprises the camera detecting the optical signal emitted by each of said shelf devices at a corresponding position within the captured images;
- it further comprises the camera associating each detected optical signal to its corresponding position within a report file and sending said report file to an inventory management server before switching back to the sleep mode;
- the shelf devices are article matching devices arranged on shelves of the fixture so that an article localization is derivable from a localization of an associated article matching device and the inventory management server identifies an article matching device identifier stored in a database based on a detected optical signal within the report file and localizes an article area based on determining an article identifier associated to the article matching device identifier;
- the localized article area is used to fill a planogram indicating the placement of articles in the fixture.

BRIEF DESCRIPTION OF THE DRAWINGS

Other aspects, aims, advantages and features of the invention will better appear upon reading the following detailed description of preferred embodiments thereof, provided as a non-limiting example, and done in reference to the appended drawings, in which.

DETAILED DESCRIPTION OF THE INVENTION

In all the following, we will describe inventory management methods and systems, based for instance on computer-vision technologies, for the localization of shelf devices arranged on shelves of a fixture. A preferred, although non limiting, application of the invention relates to shelf devices capable to display article information for customers and/or personnel of a sales area, for instance ESLs. But the invention described below can also be considered for instance for stock management in a warehouse using shelf devices which are not necessary part of a system for display of information related to products of a sales area but which nevertheless can, in certain embodiments, be located in areas where specific articles are expected to be retrieved.

In a preferred embodiment, the shelf devices are ESLs arranged in a sales area and localizing the ESLs may be used for updating or initializing a realogram database which memorizes a correspondence between a "matching area" visible in an acquired image of a fixture (for instance a gondola) and an ESL also visible in said image. The matching area of an ESL is an area of the gondola wherein the articles associated with the ESL are expected to be shown. Predetermined rules for automated recognition of the matching area of the gondola, starting from a given ESL localization, can indeed be used. For instance, a rule for identifying a matching area can be defined as follows: for a given detected ESL in a gondola, the zone which is situated immediately above said ESL, and situated between said ESL and the consecutive ESL on the right side, is determined as the matching area of said ESL in the gondola. The problem can also be considered in reverse: for a given area of a gondola which is meant to show articles, the corresponding ESL is the nearest ESL situated in the row immediately below said area of the gondola, on the left side.

Figure 1:
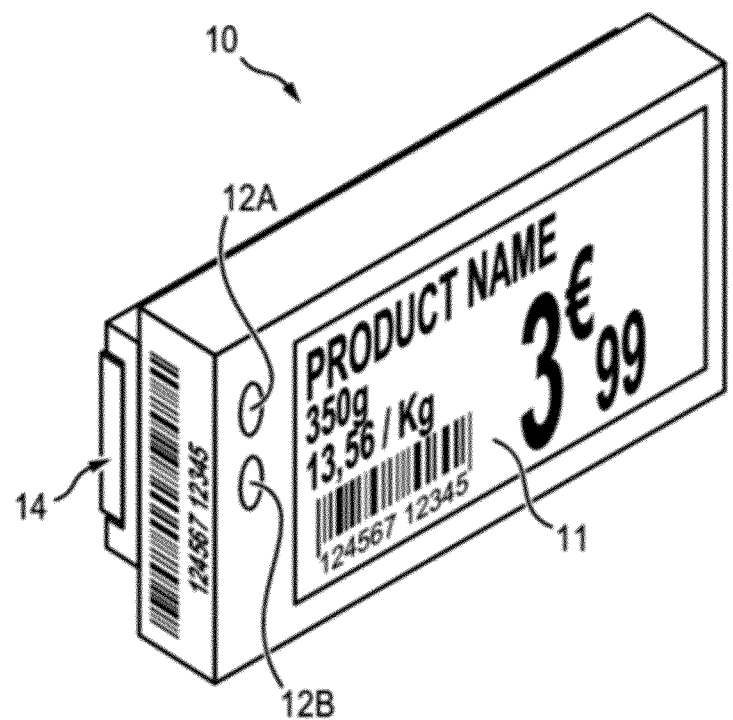
FIG. 1 shows an electronic shelf label equipped with light indicators that can be used to localize it.

An exemplary electronic shelf label 10 with light emission capability is represented in FIG. 1. Said ESL has a unique label identifier which unmistakably identifies said ESL. Advantageously, said label identifier is visible on the ESL, typically in the form of a scannable barcode. In the case of ESL 10, the label identifier is a 8-digit hexadecimal string, which is shown in numerical form, and in barcode form, on a right side of the ESL. In addition, ESL 10 comprises on the front side a screen display 11, typically a liquid crystal display or a LED display, for showing information related to an article. This information typically comprises the price of the article, in compliance with regulatory requirements, along with other required information such as price per kilo. ESL 10 also comprises a casing 14 on the rear side, containing the electronics required for operating the ESL. Said electronics comprises a RF (radiofrequency) chip and may further comprise a short-range communication peripheral such as a NFC (Near Field Communications) or a RFID (Radio Frequency Identification) chip. By means of said RF chip, the ESL can receive, and optionally also emit, RF signals. The casing 14 also comprises a microcontroller for translating received RF signals into electronic signals for controlling the screen display 11.

In addition, ESL 10 also comprises light-emitting means. The light-emitting means can comprise two or more light-emitting indicators 12A and 12B. Said two light-emitting indicators are able to emit light signals, not necessarily within the visible range, in response to an instruction transmitted via radiofrequency to ESL 10. Said two light-emitting indicators can typically be LED sources, or alternatively, the light-emitting indicators can be any other kind of light sources able to briefly emit a detectable light signal. In the case of ESL 10, said two light-emitting sources are located on the front side of the ESL. Alternatively, an ESL comprising only one light-emitting indicator could also be used for the methods which will be described below. The light-emitting indicators 12A and 12B of ESL 10 are connected to a control circuit which is configured to receive electronic signals from the RF peripheral of the ESL. In this manner, the light-emitting means, in this case the light-emitting indicators 12A and 12B, can light up in response to an instruction transmitted to ESL 10 via radiofrequency. Advantageously, the light-emitting means (light-emitting indicators 12A and 12B here) are configured to emit light signals in one or more colors. For instance, the indicator 12A can emit in blue and the indicator 12B can emit in red. Alternatively, one or more light-emitting indicators can emit light with a predetermined timing pattern (that is, a sequence of emissions of light signals for predefined durations), in order to facilitate recognition of the ESLs emitting an optical signal for recognition, or in order to allow discriminating several ESLs sending optical signals simultaneously.

Figure 2:
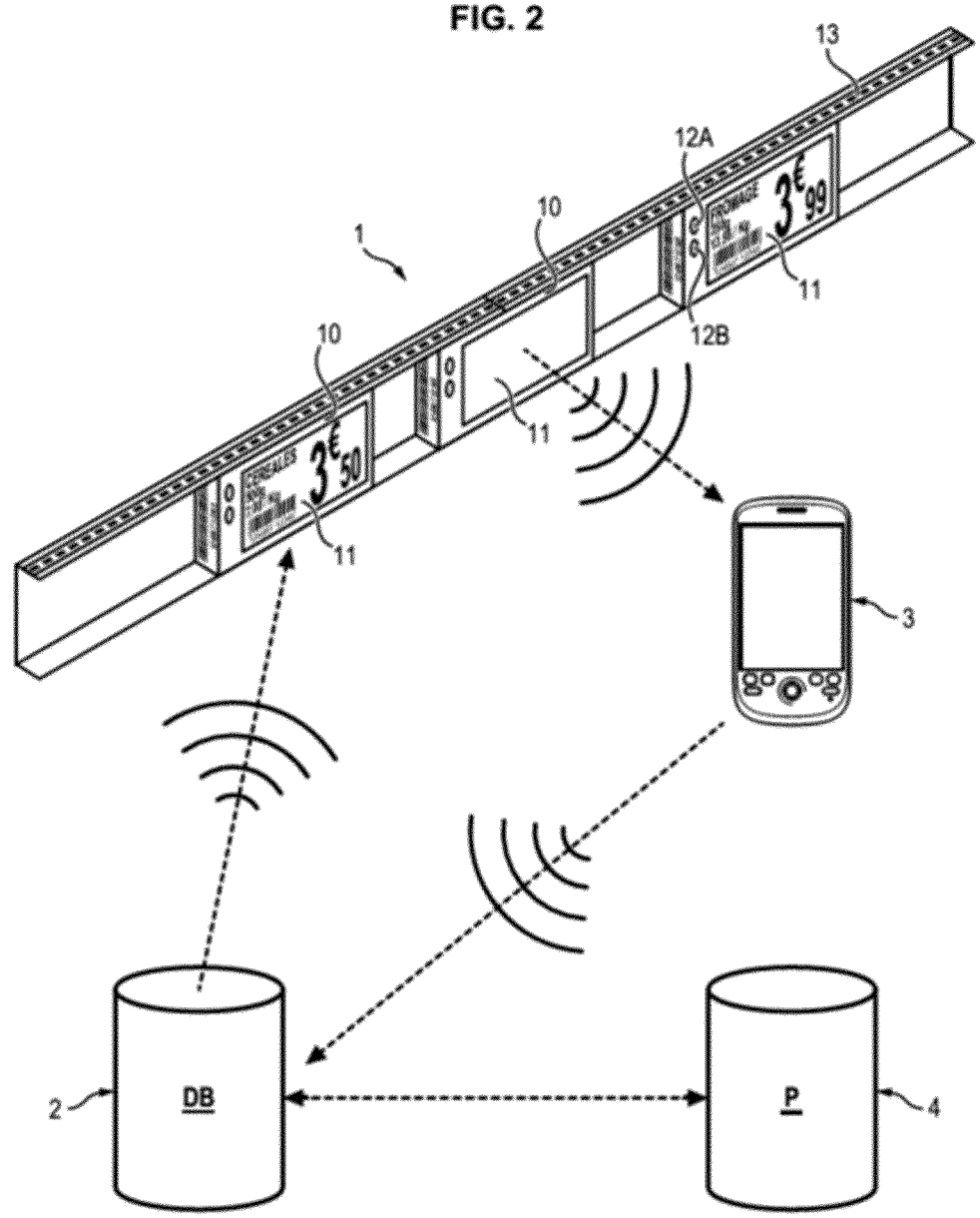
FIG. 2 shows a shelf management system for a sales area.

A system for showing article information in a gondola of a sales area is shown in FIG. 2. This system comprises an electronic shelf labelling sub-system 1 disposed on one or a plurality of gondolas, an ESL management server 2 (also referred below as a shelf device management server) and an inventory management server 4 which can be part of the system of the sales area or external to the sales area. Both servers 2, 4 are capable of communicating together, via a wired or wireless connexion or a mixed thereof.

In the example of FIG. 2, the electronic shelf labelling sub-system 1 comprises three ESLs 10 arranged on a shelf rail 13 located on the edge of a shelf for showing articles, situated in a row of the gondola. Other shelf rails similar to shelf rail 13, on which ESLs are mounted, are preferably spread all over the sales area, so that the article information provided in the whole area is consistent with information stored in the ESL management server 2. Each of the ESLs 10 corresponds to one article on sale, which can itself be identified by a specific article identifier, such as a EAN code. A mobile terminal 3, typically a smartphone, may be used both to acquire a label identifier of an ESL and to communicate remotely with the ESL management server 2. Communication between the mobile terminal 3 and the ESL management server 2 can be carried out according to any communication network such as Wi-Fi, 3G or 4G, or DECT. The mobile terminal 3 can be able to acquire a label identifier of an ESL by image reading of a barcode situated on the ESL, or alternatively, by short-range communication with the ESL, such as NFC shot-range communication with the NFC chip of the ESL. The ESL management server 2 is able to communicate via radiofrequency with each of the ESLs 10. Indeed, the ESL management server 2 can transmit a RF signal (radiofrequency signal) comprising a label identifier, so that the information contained in the RF signal is specifically received by the ESL identified by said label identifier. RF communication between the ESL management server 2 and the ESLs can be carried out in any known radio frequency range. For instance, the ESL management server 2 can communicate with the ESLs 10 within a range of 700 to 1000 MHZ, especially in frequencies of 779 MHZ, 868 MHz or 915 MHZ. Alternatively, said frequency range can correspond to very high frequencies, such as 2.4 GHz frequency (Wi-Fi frequency). In another alternative, said frequency range can correspond to low frequencies, of fewer than 40 KHz.

The ESL management server shown in FIG. 2 comprises a central file DB storing association information between ESLs present in the sales area and articles on sale, for instance in the form of table associations between a unique label identifier and a EAN number of an article. The inventory management server 4 comprises a realogram database P which comprises association information between shelf spaces and label identifiers of ESLs. In addition, the realogram database P can also comprise association information between shelf spaces fields and article identifiers, such as EAN numbers of articles.

Each shelf space may be identified by three numerical indices. The first index i corresponds to a gondola of the sales area, which can comprise one or a plurality of rows which are stacked one on top of each other parallelly. The second index j corresponds to a particular row j of the gondola i. The third index k corresponds to a particular electronic shelf label within the row j. The combination of indices i, j, k in a triplet (i,j,k) allow unambiguous identification of a single area of the gondola, matched with a single ESL. The unique label identifier, identifying one ESL of the sales area, associated with the shelf space (i,j,k) of gondola i in realogram database P can be noted $P_{ijk}$. As mentioned above, each shelf space (i,j,k) is also preferably associated with an article identifier, which can be noted $P'_{ijk}$. In this latter case, the unique label identifier $P_{ijk}$ is thus associated in the central file DB of the inventory management server 4 with the article identifier $P'_{ijk}$.

As depicted on FIG. 2, the inventory management server 4 is distinct from the ESL management server 2. Thus, the function of communication with the electronic shelf labels 10 and of management (access and modification) of the central file DB, and the other function of management (access and modification) of the realogram database P are provided by two distinct servers. While the ESLs management server 2 is accessible by the personnel of the sales area, for management of the ESLs 10 and the central file DB, the inventory management server 4 is not necessarily accessed by the personnel of the sales area, depending on whether said personnel is also in charge of the management of the realogram database P. It is possible that the realogram database P is solely used by an administrator of the inventory management server 4, without an administrator of the ESLs management server 2 being able to modify the realogram database P.

Anyhow, management for the central file DB and management of the realogram database P can alternatively be carried out by the same server (be it the ESLs management server 2 or the inventory management server 4).

An inventory management method in accordance with the invention is now described with reference to FIG. 3. This method comprises the steps of:
- controlling shelf devices AID (e.g. ESLs) arranged on shelves of a fixture (e.g. a fixture of a sales area, such as a gondola) to cause the shelf devices to implement a localization process;
- controlling at least one sensor CAM to acquire sensor signals during the localization process (e.g. a camera arranged to acquire an image or a sequence of images of the fixture, typically a video sequence showing the fixture); and
- localizing each of said shelf devices AID based on the acquired sensor signals.

In accordance with the invention, controlling said shelf devices comprises sending a device command D-Cd to each of said shelf devices AID. The device command includes a localization process execution time and causes each of said shelf devices to have been switched from a sleep mode SLPd to a wake-up mode WU-BLK at the localization process execution time and, while in the wake-up mode, to emit a localization signal before switching back to the sleep mode.

Still in accordance with the invention, controlling said (at least one) sensor comprises sending a sensor command C-Cd to the sensor CAM. The sensor command includes the localization process execution time and causes the sensor to have been switched from a sleep mode SLPc to a wake-up mode WU-CAP at the localization process execution time and, while in the wake-up mode, to capture the localization signal emitted by each of said shelf devices before switching back to the sleep mode.

This controlling may involve controlling all the shelf devices and all the sensors arranged in a specific area, such as all the shelf devices and sensors arranged in a sales area, for instance all the shelf devices and sensors arranged in a retail store.

As a result of said controlling of the shelf devices and of the sensor(s), all shelf devices and the sensor(s) are caused to wake up at around to same time to perform the localization process of all the shelf devices concurrently and to thereafter switch back to sleep. This helps minimizing the waking time of the shelf devices and of the sensor(s), thus minimizing their battery consumption and improving their service life.

Figure 3:
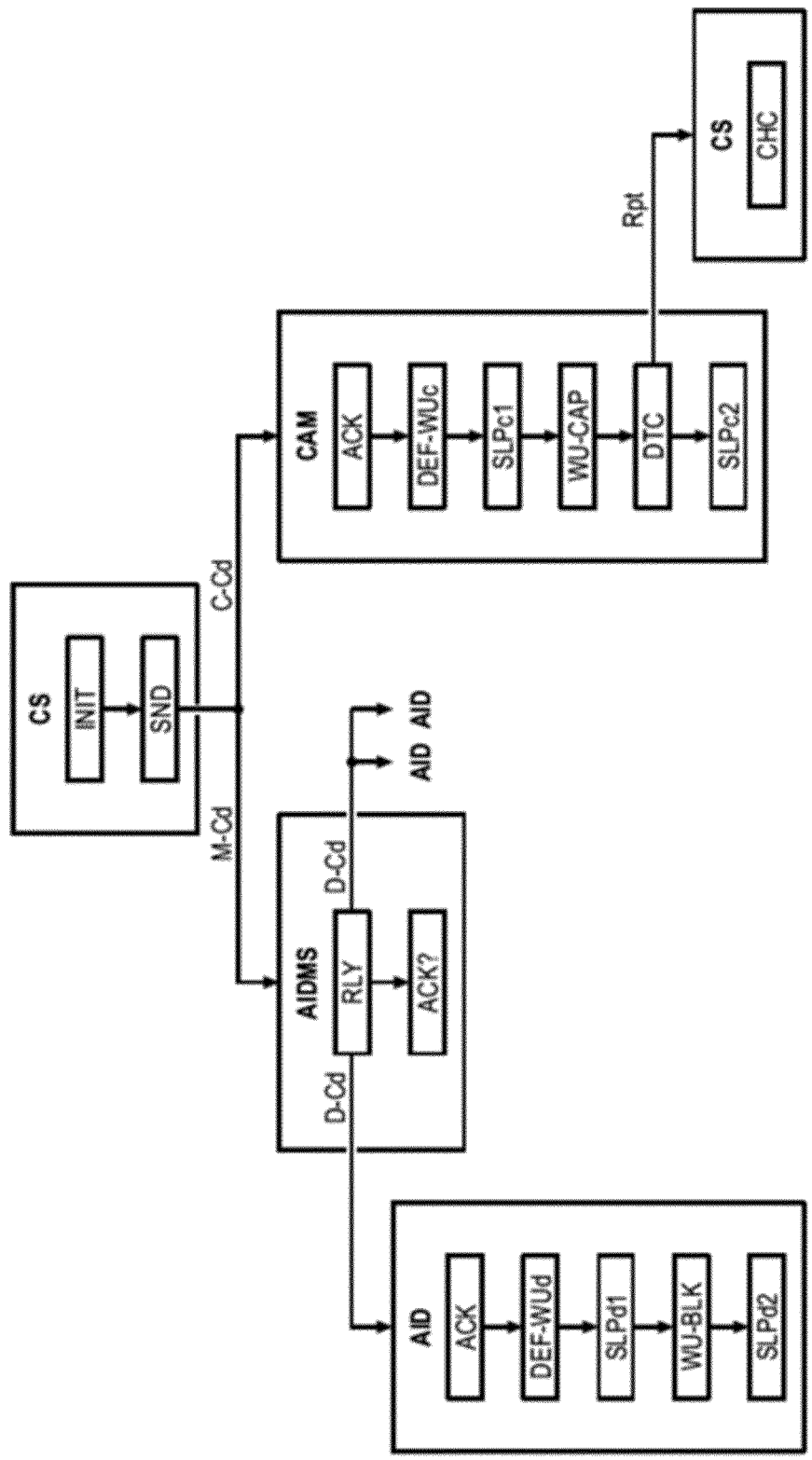
FIG. 3 shows steps implemented in an inventory management method according to a possible embodiment of the invention.

In an embodiment illustrated by FIG. 3, the sensor command C-Cd is sent from a synchronisation server CS to the sensor CAM (typically wirelessly, for instance based on cellular technologies such as 4G or 5G or based on WiFi technologies) and the device command D-Cd is sent (for instance wirelessly, based on a store/warehouse RF network) to each of said shelf devices AID from a shelf device management server AIDMS (e.g. the ESL management server 2 shown on FIG. 2) following receipt by the shelf device management server AIDMS of a management command M-Cd from the synchronization server CS. It shall be noted that the synchronisation server CS may be distinct or not from the inventory management server 4 shown on FIG. 2.

In another embodiment, the sensor command C-Cd is sent from the synchronisation server CS to the sensor CAM and the device command D-Cd is sent from the sensor CAM to shelf devices AID arranged into proximity with the sensor following receipt by the sensor CAM of the management command M-Cd from the synchronization server CS. In this embodiment, the sensor and the shelf devices are equipped with suitable means, such as a nearfield radio, to enable communication between the sensor and the nearby shelf devices.

In these two embodiments, a sensor command C-Cd may be sent to each sensor individually for instance based on a wake-up cycle of the sensor.

The synchronisation server CS may be configured to allow a user to set the localization process execution time (for instance at 11 pm) and to select shelf devices which should perform the localization process (such as for instance all the ESLs arranged in a specific store section). The synchronisation server CS may further be configured to allow a user to select at least one sensor which should be involved in the localization process. The synchronisation server CS is further configured to initialise the localisation process by elaborating the sensor command with information indicative of the localization process execution time together, if need be, with information identifying the selected sensor(s) and of elaborating the management command with information indicative of the localization process execution time together, if need be, with information identifying the selected shelf devices.

In an embodiment, the sensor command and the management command are sent by the synchronisation server at a predetermined period before the localization process execution time (for instance 10 minutes before the localization process execution time).

Upon receipt of the management command M-Cd, the shelf device management server AIDMS sends the device command (box RLY in FIG. 3), for instance by relaying the management command, to each shelf device AID that should execute the localization process, as for instance indicated within the management command. The device command may be a broadcast command sent to all the shelf devices that are to be involved in the synchronization (for instance a signal of duration long enough to cover a wake-up period of each shelf device) or a selective multicast or unicast command based for instance on an identifier of a shelf device or on a wake-up cycle of the shelf device.

In an embodiment, the shelf device management server AIDMS then waits for receiving an acknowledgement (box ACK? in FIG. 3) from each shelf device to which a device command was sent and which should execute the localization process. In the absence of an acknowledgement being received from a shelf device, typically after a preset period of time, the shelf devices management server AIDMS resends the device command to the shelf device which failed to acknowledge reception of the device command. The device command may be resent a plurality of times until it is acknowledged that the shelf device received the device command.

Upon receipt of the device command, a shelf device AID is configured to switch from the sleep mode to the wake-up mode. The shelf device then sends an acknowledgement (box ACK in FIG. 3) to the shelf device management server AIDMS and schedules (box DEF-WUd) a wake-up event based on a device command arrival time and the localization process execution time before switching back to the sleep mode (box SLPd1). The shelf device AID may calculate the time difference (for instance in milliseconds) between the time at which it receives the device command and the localization process execution time, and set an internal timer based on the calculated difference to wake up when the localization process execution time is reached. When the internal timer is counted to zero, the shelf device wakes up (box WU-BLK), performs the localization process and goes back to sleep afterwards (box SLPd2).

After sending the sensor command C-Cd, the synchronisation server CS waits for receiving an acknowledgement from the sensors to which a sensor command was sent. In the absence of an acknowledgement being received from a sensor, typically after a preset period of time, the synchronisation server resends the sensor command to the sensor which failed to acknowledge reception of the sensor command. The sensor command may be resent a plurality of times until it is acknowledged that the sensor received the sensor command.

Upon receipt of the device command, a sensor CAM is configured to switch from the sleep mode to the wake-up mode. The sensor then sends an acknowledgement (box ACK in FIG. 3) to the synchronization server and schedules (box DEF-WUc) a wake-up event based on a sensor command arrival time and the localization process execution time before switching back to the sleep mode (box SLPc1). The sensor CAM may calculate the time difference (for instance in milliseconds) between the time at which it receives the sensor command and the localization process execution time, and set an internal timer based on the calculated difference to wake up when the localization process execution time is reached. When the internal timer is counted to zero, the sensor wakes up (box WU-CAP), performs the localization process (box DTC) and goes back to sleep afterwards (box SLPc2).

In an embodiment, the sensor is a camera arranged to capture images of the fixture during the localization process, the localization signal emitted by each of the shelf devices during the localization process is an optical signal and localizing each of said shelf devices comprises determining a position of each of said shelf devices within the captured images.

The optical signal emitted by a shelf device (for instance by the light-emitting indicator 12A and/or the light-emitting indicator 12B of an ESL) may be emitted in the visible range or within the invisible range such as in the infrared range. In a preferred embodiment, the optical signal emitted by a shelf device may include distinctive (i.e. unique to the shelf device) temporal and/or spatial patterns of optical changes, such as changes in intensity or spectrum, for instance a distinctive series of light pulses.

Determining a position of each of said shelf devices within the captured images may comprise the camera detecting (box DTC in FIG. 3) the optical signal emitted by each of said shelf devices at a corresponding position within the captured images. In this embodiment, optical signal detection is performed directly in the camera rather than in the synchronisation server, which proves useful to avoid bandwidth issues that would otherwise arise when transmitting video streams from multiple cameras to the synchronisation server.

The camera CAM may further be configured to associate each detected optical signal to its corresponding position within a report file Rp and send said report file to the synchronisation server CS (which may be distinct or not from an inventory management server, such as server 4 on FIG. 2), before switching back to the sleep mode (box SLPc2 on FIG. 3). Taking as an example blinking optical signals, the report file may comprise an on/off pattern per detected blinking spot together with an image with marked blink areas (i.e. the positions corresponding to the detected optical signals).

The synchronisation server may then check whether any detected optical signal is a valid optical signal that matches a signal to be emitted by a shelf device during the localization process. If yes, the synchronisation server can associate the shelf device to its corresponding position within the captured images of the fixture and, based on a known location of the camera, derive therefrom its localisation within the sales area/warehouse.

In an embodiment, the shelf devices are article matching devices, e.g. ESLs, arranged on shelves of the fixture so that an article localization is derivable from a localization of an associated article matching device. In this embodiment, the synchronisation server CS may identify (box CHC in FIG. 3) an article matching device identifier stored in a database based on a detected optical signal within the report file (typically when the detected optical signal is unique to the article matching device) and localizes an article area based on determining an article identifier associated to the article matching device identifier. The localized article area may then be used to fill a planogram indicating the placement of articles in the fixture.

Additional image processing steps may be performed based on the images captured by the camera, for instance to check for the presence of articles within a localized area (where identification of an empty area may be carried out by color recognition with respect to a predetermined pattern of the fixture), to check whether the articles in the localized area are the correct ones (for instance based on image comparison between the images and product pictures), to count products, etc.

The invention is not limited to the method described above but also extends to an inventory management server which comprises a processing unit configured to implement the controlling steps of the method. The invention further relates to a computer-program product comprising instructions which, when the program is executed by a computer, cause the computer to carry out the controlling steps of the method.

The invention claimed is:

1. An inventory management method comprising:
   controlling shelf devices arranged on shelves of a fixture to cause the shelf devices to implement a localization process by sending a device command to each of the shelf devices, the device command causing each of the shelf devices to switch from a shelf device sleep mode to a shelf device wake-up mode at a localization process execution time and to emit a localization signal before switching back to the shelf device sleep mode;
   controlling a sensor to acquire sensor signals during the localization process by sending a sensor command to the sensor, the sensor command causing the sensor to switch from a sensor sleep mode to a sensor wake-up mode at the localization process execution time and to capture the localization signal emitted by each of the shelf devices before switching back to the sensor sleep mode; and
   performing the localization process on each of the shelf devices concurrently based on the acquired sensor signals.

2. The inventory management method of claim 1, wherein the sensor command is sent from a synchronisation server to the sensor and the device command is sent to each of the shelf devices from a shelf device management server following receipt by the shelf device management server of a management command from the synchronization server.

3. The inventory management method of claim 2, wherein the sensor command and the management command are sent by the synchronisation server at a predetermined period before the localization process execution time.

4. The inventory management method of claim 1, wherein, in response to receiving the device command, each of the shelf devices schedules a wake-up event based on a device command arrival time and the localization process execution time.

5. The inventory management method of claim 1, wherein, in response to receiving the sensor command, the sensor schedules a wake-up event based on a sensor command arrival time and the localization process execution time.

6. The inventory management method of claim 1, wherein:
   the sensor is a camera arranged to capture images of the fixture during the localization process;
   the localization signal emitted by each of the shelf devices during the localization process is an optical signal; and
   performing the localization process on each of the shelf devices comprises determining a position of each of the shelf devices within the captured images.

7. The inventory management method of claim 6, wherein determining a position of each of the shelf devices within the captured images comprises detecting, with the camera, the optical signal emitted by each of the shelf devices at a corresponding position within the captured images.

8. The inventory management method of claim 7, further comprising:
   associating each detected optical signal to its corresponding position within a report file; and
   sending the report file to an inventory management server before switching back to the sensor sleep mode.

9. The inventory management method of claim 8, wherein:
   the shelf devices are article matching devices so that an article localization is derivable from a localization of an associated article matching device; and
   the inventory management server identifies an article matching device identifier stored in a database based on a detected optical signal within the report file and localizes an article area based on determining an article identifier associated to the article matching device identifier.

10. The inventory management method of claim 9, wherein the localized article area is used to fill a planogram indicating the placement of articles in the fixture.

11. A non-transitory computer-readable medium storing instructions which, when executed by a computer, cause the computer to carry out the inventory management method of claim 1.

12. An inventory management server, comprising a processing unit configured to implement the inventory management method of claim 1.

* * * * *